United States Patent [19]

Zieren et al.

[11] Patent Number: 5,513,057
[45] Date of Patent: Apr. 30, 1996

[54] MAGNETIC HEAD WITH WEAR RESISTANT LAYER HAVING ALIGNMENT MARK, AND MAGNETIC HEAD UNIT INCORPORATING SAME

[75] Inventors: Victor Zieren; Jacobus J. M. Ruigrok; Mathijs De Jongh; Arnold Broese Van Groenou, all of Eindhoven, Netherlands

[73] Assignee: U.S. Philips Corporation, New York, N.Y.

[21] Appl. No.: 441,712

[22] Filed: May 15, 1995

Related U.S. Application Data

[63] Continuation of Ser. No. 231,350, Apr. 20, 1994, abandoned, which is a continuation of Ser. No. 911,559, Jul. 8, 1992, abandoned.

[30] Foreign Application Priority Data

Jul. 19, 1991 [NL] Netherlands ............... 9101270

[51] Int. Cl.⁶ .................................... G11B 5/187
[52] U.S. Cl. ................ 360/122; 360/125; 360/126
[58] Field of Search ............................... 360/103, 104, 360/113, 119, 122, 125, 126

[56] References Cited

U.S. PATENT DOCUMENTS

| | | | |
|---|---|---|---|
| 3,737,583 | 6/1973 | Tsuchiya et al. | 360/125 |
| 4,052,748 | 10/1977 | Kuijk | 360/113 |
| 5,050,027 | 9/1991 | Meunier et al. | 360/122 |
| 5,074,486 | 12/1991 | Vollmann | 242/199 |
| 5,079,831 | 1/1992 | Reid | 360/125 |
| 5,192,618 | 3/1993 | Frankel et al. | 360/110 |
| 5,237,476 | 8/1993 | Bischoff et al. | 360/126 |

FOREIGN PATENT DOCUMENTS

| | | |
|---|---|---|
| 0075413 | 3/1983 | European Pat. Off. . |
| 0123826 | 7/1984 | European Pat. Off. . |
| 0381266 | 8/1990 | European Pat. Off. . |

*Primary Examiner*—Robert S. Tupper
*Assistant Examiner*—Jefferson Evans
*Attorney, Agent, or Firm*—John C. Fox; Norman N. Spain

[57] ABSTRACT

Magnetic head unit comprising a magnetic head secured in a housing and having a magnetic head structure provided with a head face and at least one transducing gap terminating in the head face. A wear-resistant layer (31) having at least one alignment mark (35, 36, 37) occupying a defined position with respect to the transducing gap is provided on the head face.

20 Claims, 3 Drawing Sheets

MAGNETIC HEAD WITH WEAR RESISTANT LAYER HAVING ALIGNMENT MARK, AND MAGNETIC HEAD UNIT INCORPORATING SAME

This application is a Continuation of Ser. No. 08/231,350 filed Apr. 20, 1994, now abandoned; which is a Continuation of Ser. No. 07/911,559 filed Jul. 8, 1992, now abandoned.

BACKGROUND OF THE INVENTION

The invention relates to a magnetic head unit comprising a magnetic head secured to a support and having a magnetic head structure provided with a head face and at least one transducing gap terminating in the head face.

The invention also relates to a magnetic head and to a magnetic head structure for use in the magnetic head.

A support in the form of a housing comprising a magnetic head unit is known from U.S. Pat. No. 5,074,486; herewith incorporated by reference. The known magnetic head unit comprises a magnetic head intended for cooperation with a magnetic tape, which head is mounted in a housing provided with tape guides. The magnetic head has a magnetic head structure with a tape contact face and a transducing gap.

In a recording/reproducing system it is important that during recording signals on a magnetic tape, a write gap of a magnetic head is at the same position and at the same angle with respect to the magnetic tape as a read gap during reading the recording signals, in order to inhibit signal loss. Said tape guides of the known magnetic head unit ensure that the magnetic tape always occupies the same position with respect to the magnetic head. For reasons of compatibility it is also required that the transducing gap of the magnetic head occupies a defined position with respect to the tape guides of the housing. To this end, magnetic heads are aligned as to position and direction before they are built in. In the case of thin film heads, use can be made of a visible layer terminating in the head face, for example, a flux guide layer. For bulk heads, the visible transducing gap itself may be used as a reference.

A known drawback of magnetic heads which are in contact with a magnetic medium, particularly a magnetic tape, during operation is that the head face is subject to wear. Particularly in thin-film magnetic heads the thin-film layer structure may give rise to very considerable wear within a short period of operation, thus ensuring only a short lifetime of the magnetic head unit. It is known per se to provide wear-resistant layers on the head faces of magnetic heads in order to inhibit wear. In this connection it has been proposed in EP-A 0,123,826 (herewith incorporated by reference) to provide the head face of a magnetic head with a sputtered layer of titanium carbide, chromium carbide or titanium nitride having a thickness of at most 0.2 micron.

A drawback of providing a wear-resistant layer, particularly a layer which is not transparent to visible light, is that the alignment of the magnetic head with respect to a support or a housing of the magnetic head unit is seriously impeded and is no longer possible with the aid of a visible-light microscope. Under such circumstances, only special equipment using, for example, an IR microscope or a phase-contrast microscope provides the possibility of reliable alignment.

OBJECTS AND SUMMARY OF THE INVENTION

It is an object of the invention to provide a magnetic head unit having a wear-resistant magnetic head aligned by means of simple equipment.

The magnetic head unit according to the invention is therefore characterized in that a wear-resistant layer forming a contact face and having at least one alignment mark occupying a defined position with respect to the transducing gap is provided on the head face of the magnetic head.

When the magnetic head is being built into the magnetic head unit according to the invention, the magnetic head is aligned with respect to a reference plane by means of the alignment mark and by using a simple microscope before it is definitively secured to the support. In order to position the magnetic head accurately as regards position and direction, the wear-resistant layer is preferably provided with various, preferably small alignment marks.

The magnetic head unit according to the invention is eminently suitable for analog as well as digital applications. Examples of applications are multi-track audio, video and data recording. A particularly suitable application is the longitudinal magnetic tape recording system as described in U.S. patent application Ser. No. 07/473,085, filed Jul. 24, 1992, and; herewith incorporated by reference.

An embodiment of the magnetic head unit according to the invention is characterized in that the alignment mark is formed by an area having a structure which differs from the structure of the wear-resistant layer. The area having the different structure in the form of, for example, ridges or a pattern of elevations can be provided photolithographically.

A practical embodiment of the magnetic head unit according to the invention is characterized in that the alignment mark has at least one cavity which is present in the wear-resistant layer.

An embodiment of the magnetic head unit according to the invention is characterized in that the area having the different structure has a relief with a periodicity of at least ¼ $\lambda$, in which $\lambda$ is the wavelength of light, particularly visible light. The different structure is in general insufficiently visible at a periodicity of less than ¼ $\lambda$.

An embodiment of the magnetic head unit according to the invention is characterized in that the wear-resistant layer has at least one further alignment mark. An advantage thereof is that the azimuth angle, i.e. the angle at which the transducing gap extends to the normal on the direction of displacement of the magnetic medium, can be accurately adjusted when the magnetic head is being mounted.

An embodiment of the magnetic head unit according to the invention in which the magnetic head has a group of transducing gaps as shown, for example, in said U.S. patent application Ser. No. 07/473,085, is characterized in that the group of transducing gaps is present between the first-mentioned alignment mark and the further alignment mark. If the two alignment marks are in a plane parallel to the plane of the group of transducing gaps, the azimuth angle can be adjusted in a simple manner. If the two planes coincide, the group of gaps can be positioned with respect to a reference plane in an extremely simple manner.

A technologically attractive embodiment of the magnetic head unit according to the invention is characterized in that the head face has a head face area corresponding to the area having the different structure.

During manufacture of this magnetic head unit, an area having a different structure is formed in the head face, for example, by means of etching, before the wear-resistant layer is provided. One advantage of this is that the area having the different structure can easily be positioned and aligned with respect to the transducing gap, while parts of the magnetic head structure are visible in the head face. A further advantage is that it is not necessary to take special precautions when the wear-resistant layer is being provided by means of, for example, sputtering or vapour deposition, because the area having the different structure is copied in the wear-resistant layer due to the small thickness of this layer and therefore remains visible.

It is to be noted that EP-A-0 075 4 13 (herewith incorporated by reference) discloses a magnetoresistive card-reading head comprising a sapphire substrate, one face of which is intended for cooperation with magnetically encoded cards and an opposite face is provided with MR elements. The last-mentioned face is also provided with a registration mark for use in aligning the substrate during a stage of the manufacturing process.

It is a further object of the invention to provide a magnetic head which is suitable for use in the magnetic head unit according to the invention. To this end the magnetic head according to the invention has a magnetic head structure which is provided with a head face and at least one transducing gap terminating in the head face, and is characterized in that a wear-resistant layer which is not transparent to visible light, is present on the head face and forms a contact face for co-operation with a magnetic medium. When used in the previously described magnetic head unit, the wear-resistant layer has at least one alignment mark.

In one embodiment of the invention, the magnetic head is characterized in that the wear-resistant layer has a thickness of between 20 and 100 nm. In another embodiment of the magnetic head according to the invention, having satisfactory mechanical and the wear-resistant layer substantially comprises chromium nitride.

The magnetic head preferably has a magnetic head structure fabricated means of thin-film techniques.

It is another object of the invention to provide a magnetic head unit with a magnetic head having an excellent wear-resistance. The magnetic head unit according to the invention comprising a magnetic head secured to a support and having a thin film magnetic head structure provided with a head face and at least one transducing gap terminating in the head face is therefore characterized in that a chromium nitride layer is provided on the head face of the magnetic head.

A wear-resistant layer of chromium nitride has a lower melting point as compared with many other wear-resistant materials such as, for example, titanium nitride. A lower melting point implies a higher surface mobility at the substrate temperature used during sputtering, which is 250°–350° C. maximum in connection with the preservation of the magnetical properties of the magnetic thin-film materials provided. A higher surface mobility ensures a denser and more properly bonded layer, so that the resultant wear resistance is better than that of, e.g., an intrinsically hard titanium nitride layer.

The magnetic head structure of the magnetic head of said magnetic head units comprises at least one inductive transducing element and/or at least one magnetoresistive transducing element.

BRIEF DESCRIPTION OF THE DRAWINGS

The invention will now be described in greater detail by way of example with reference to the accompanying drawings in which.

DESCRIPTION OF THE PREFERRED EMBODIMENT

Figure 1:
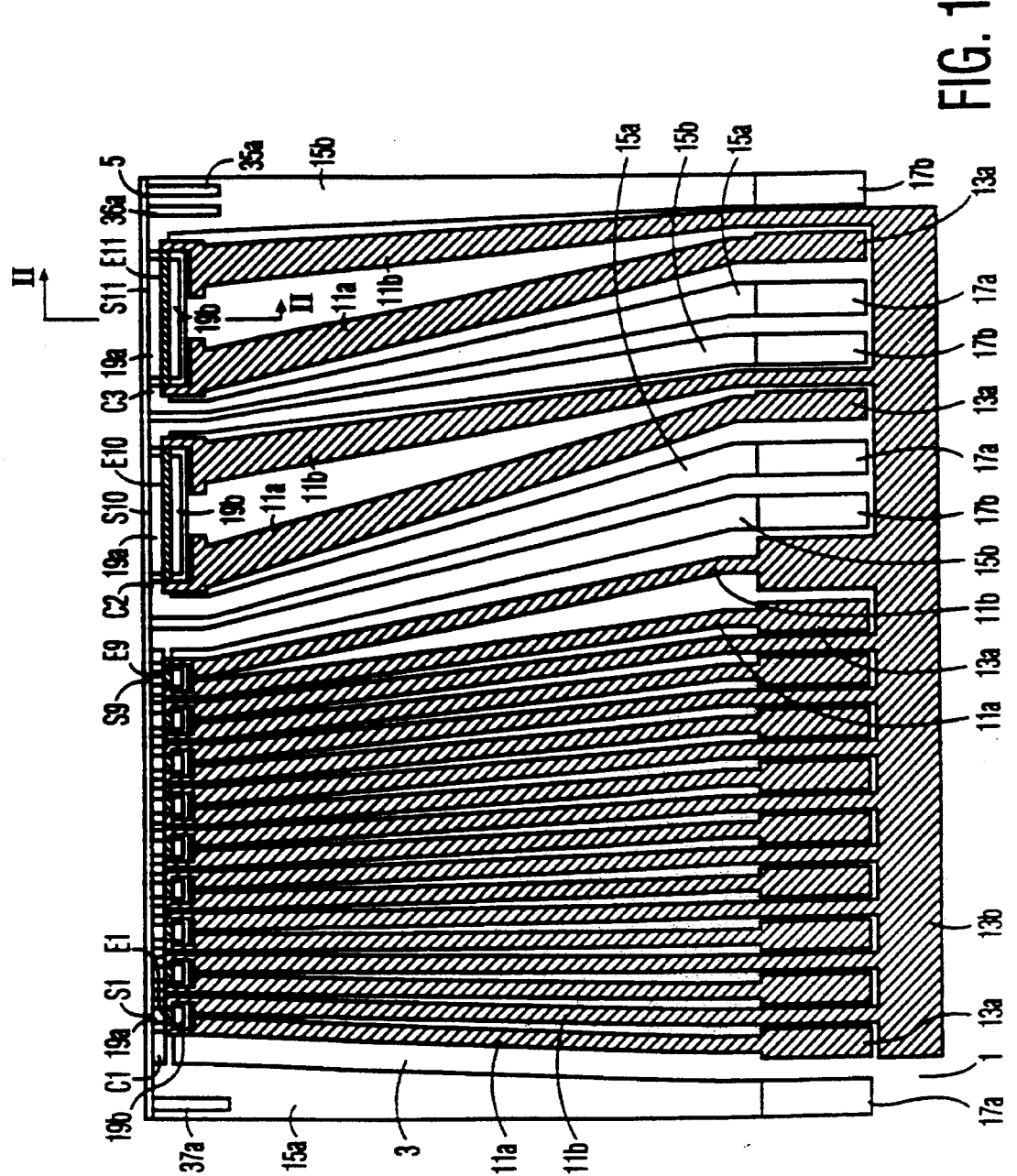
FIG. 1 shows a layout of an embodiment of the magnetic head according to the invention.
Figure 2:
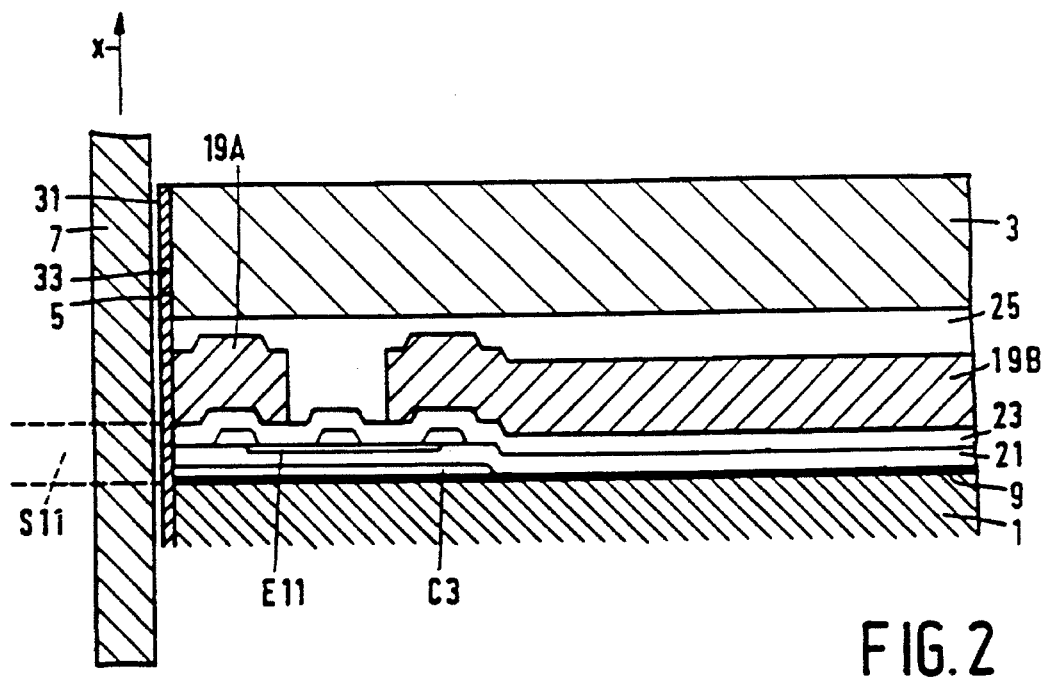
FIG. 2 is a diagrammatic cross-section II—II through a transducing gap of the magnetic head of FIG. 1.
Figure 3:
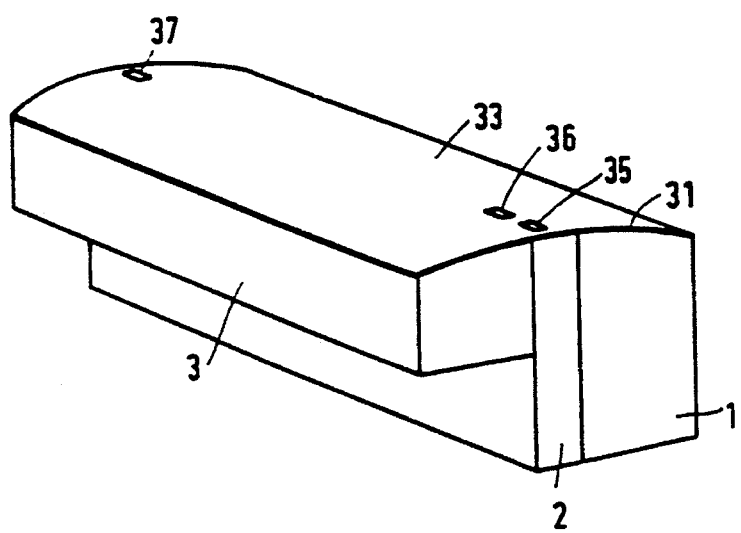
FIG. 3 is a perspective elevational view of the magnetic head shown in FIG. 1.

The thin-film magnetic head according to the invention shown in FIGS. 1, 2 and 3 comprises a support or substrate 1, in this example of a magnetic material, namely NiZn ferrite, on which a magnetic head structure 2 is provided, the magnetic head structure comprising magnetic layers, electric layers and insulation layers, and being protected by a counter block 3 of a non-magnetic material, for example $Al_2O_3/TiC$. The magnetic head has a head face 5 with eleven transducing gaps in this example. Of the eleven transducing gaps, a group of nine gaps S1 to S9 is intended to read information in a digital form and a group of two gaps S10 and S11 is intended to read information in an analog form from a record career 7 (e.g., tape) which moves along the magnetic head in a direction x. The gaps S1 to S9 for digital use generally have a smaller gap length than the gaps S10 and S11 for analog use. It is alternatively possible to choose such a gap length that both analog and digital information can be read by one and the same gap.

The magnetic head according to the invention comprises an insulation layer 9 provided on the substrate 1, which layer is provided with three electric conductors C1, C2 and C3 in this example, which may extend as far as the transducing gaps. The magnetic head further comprises eleven magnetoresistive elements E1 to E11, further referred to as MR elements which comprise, for example, an Ni—Fe layer on which one or more barberpole strips of, for example, Au may be provided. Each MR element E1 to E11 may have a pair of connection tracks 11a and 11b, further referred to as first connection tracks which terminate in first connection faces 13a and 13b. In the embodiment shown, the eleven first connection faces 13b are interconnected. Both the first connection tracks and the first connection faces are preferably made of Au. It is to be noted that an MR element provided with a barberpole is known per se and is described, inter alia, in U.S. Pat. No. 4,052,748 (herewith incorporated by reference).

Said electric conductors C1, C2 and C3 are used for driving the MR elements E1 to E9, E10 and E11 and are each provided with a pair of second connection tracks 15a and 15b which terminate in second connection faces 17a and 17b, respectively.

The magnetic head also comprises eleven pairs of flux guides of a soft-magnetic material, for example NiFe or AlFeSi, with each pair comprising a first or front flux guide 19a and, spaced apart therefrom, a second or rear flux guide 19b. The front flux guide 19a extends as far as the head face 5 for cooperation with the magnetic record carrier 7. The MR elements E1 to E11 are present between the substrate 1 and the flux guides, each MR element forming a bridge between a first and a second flux guide 19a and 19b. In certain constructions and for specific uses it is possible to omit the rear flux guides. It also possible to start from a non-magnetic substrate and to provide an extra flux guide.

The electric conductors, the MR elements and the flux guides are electrically insulated with respect to each other by a number of insulation layers of an electrically and magnetically insulating material, for example a polymer. The insulation layers are denoted by the reference numerals 21 and 23 in FIG. 2. A further insulation layer 25, for example, in the form of an adhesive layer is present between the joint flux guides 19a and 19b and the counter block 3.

A wear-inhibiting or wear-resistant layer 31 of substantially chromium nitride is provided on the head face 5, which layer forms a contact face or tape contact face 33 for cooperation with the tape-shaped record carrier 7. The chromium nitride layer 31, which is not transparent to visible light, has a thickness of 40 nm. The layer 31 has three alignment marks 35, 36 and 37 in this example, which with respect to the gaps S1 to S11 have an accurately defined position as regards location as well as direction, the gaps S1 to S11 being present in the area between the alignment marks 35 and 36 and the alignment mark 37.

Figure 4:
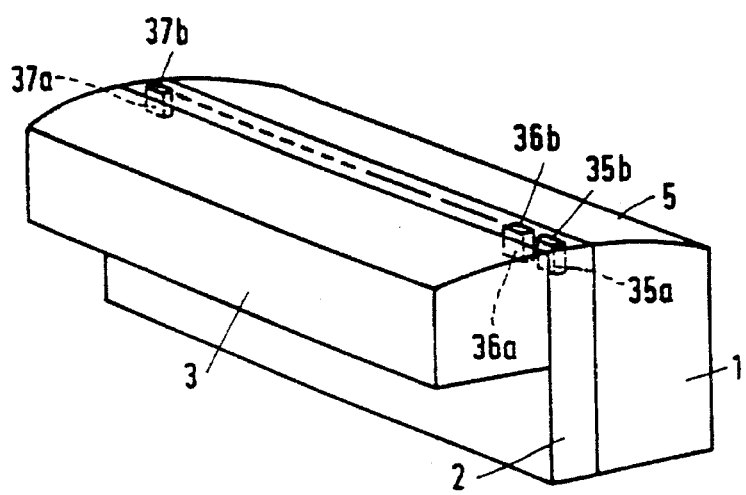
FIG. 4 is a perspective elevational view of the magnetic head of FIG. 1 in a production stage in which a wear-resistant layer has not yet been provided.

The formation of the alignment marks 35, 36 and 37 in the wear-resistant layer 31 will be described in greater detail, particularly with reference to FIGS. 2 and 4. When the magnetic head structure 2 is being formed layer by layer, three extra layers 35a, 36a and 37a, for example, strips of a polymer, are formed at a defined distance from the gaps S1 to S11 at the same time the insulation layer 21 is being provided, which extra layers terminate in the head face 5 at least after the head face 5 has been formed by means of, for example, grinding and/or lapping. By finishing the head face thus formed, cavities 35b, 36b and 37b can be formed in the head face 5 at the area of the polymer layers 35a, 36a and 37a. For example, after the head face 5 has been formed, it is cleaned by means of selective etching in an O₂ plasma, as a result of which the head face is hollowed at the area of the polymer layers 35a, 36a and 37a due to the difference in etching rate of the polymer and the material surrounding the layers 35a, 36a and 37a, for example, NiFe or an oxide. Next, the thin chromium nitride layer 31 is provided by way of sputtering on the head face 5. Due to the small thickness of this layer 31, the areas 35b, 36b and 37b formed in the head face 5 appear as similar visible areas 35, 36 and 37 in the non-transparent layer 31. Due to this property structure, the magnetic head according to the invention can be accurately aligned and built in a housing of a magnetic head unit in spite of the presence of a non-transparent layer 31 on the head face 5.

Figure 5:
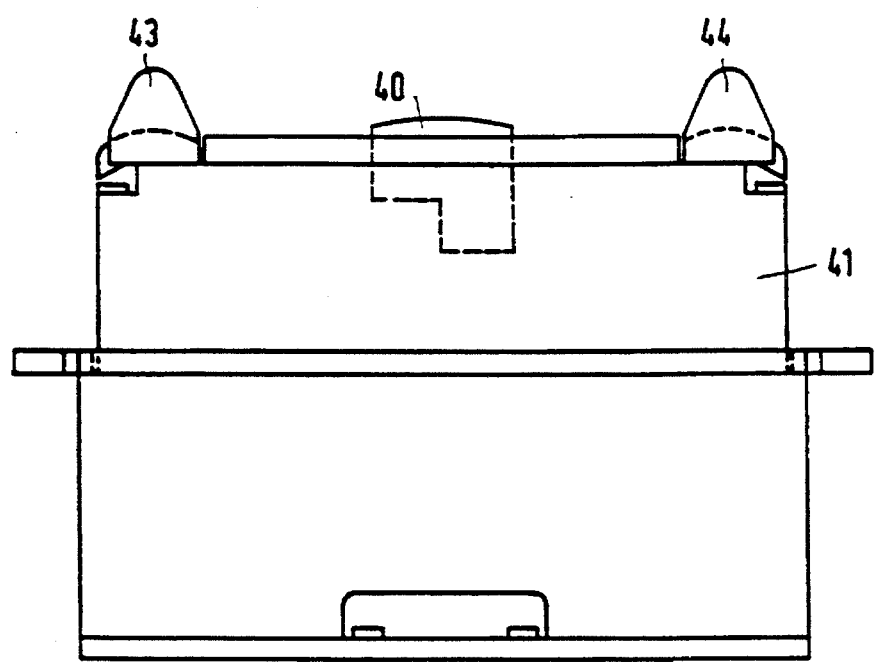
FIG. 5 is a side elevation of an embodiment of a magnetic head unit according to the invention.
Figure 6:
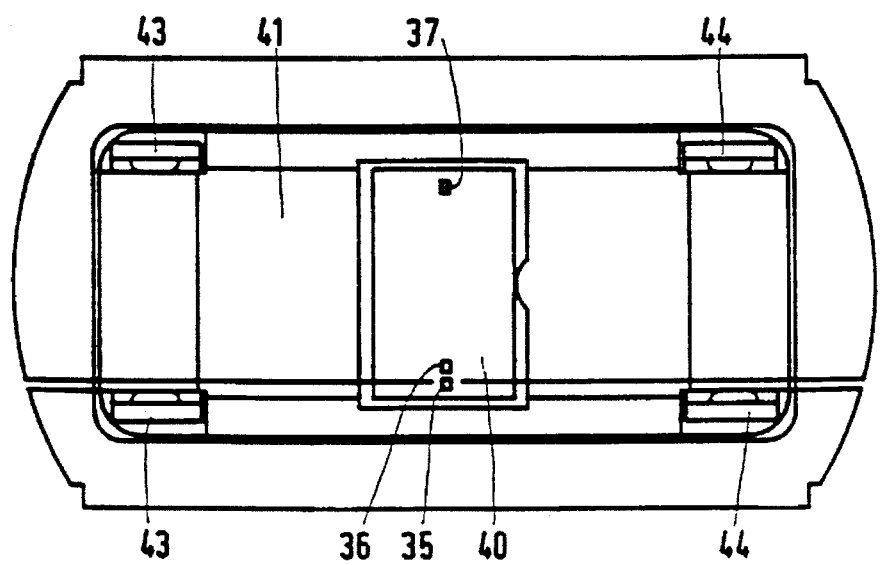
FIG. 6 is a plan view of the unit shown in FIG. 5.

The magnetic head structure according to the invention shown in FIGS. 5 and 6 comprises the magnetic head described with reference to FIGS. 1 to 4 and here being denoted by the reference numeral 40. The magnetic head structure is provided with a support in the form of a housing 41 having a pair of tape guides 43 and 44 at both sides of the magnetic head 40. These tape guides are used for accurately guiding a magnetic tape along the magnetic head. The height of the tape with respect to the magnetic head, particularly its transducing gaps, and the angle between a bounding edge of the tape and the magnetic head, particularly its joint transducing gaps, are thereby accurately maintained.

Before the magnetic head 40 is secured in the housing 41 during manufacture, it is positioned with reference to the alignment marks 35, 36 and 37 and is oriented with respect to a reference plane related to the tape guides 43 and 44 with the aid of a microscope. After the correct position and orientation have been set, with the transducing gaps occupying the correct position and direction with respect to the recording tracks of the magnetic tape to be scanned, the magnetic head 41 is secured in the housing. By using two alignment marks which are spaced apart over a short distance, such as the marks 35 and 36, it is possible to determine an average distance to the reference plane and thus enhance the aligning accuracy.

It is to be noted that the invention is not limited to the embodiments shown. For example, instead of a cavity 35, 36 or 37 as an alignment mark, it is possible to provide an alignment mark having a structure or a relief of elevations alternating with depressions, with the space between two consecutive elevations or depressions being at least equal to ¼ λ of visible light. Furthermore, different soft materials such as a photolacquer or soft metals are suitable as materials for the extra layers 35a, 36a and 37a.

We claim:

1. A magnetic head unit comprising a magnetic head secured to a support and having a magnetic head structure provided with a head face and at least one transducing gap terminating in the head face, which head face is provided with at least one head face area having a first distinguishing structure in the form of a cavity and occupying a defined position with respect to the transducing gap, a wear-resistant layer forming a contact face being provided on said head face, a contact face area of the contact face having a second distinguishing structure which matches the first distinguishing structure, and which differs from the surrounding structure of the wear-resistant layer and forms an alignment mark occupying a defined position with respect to the transducing gap.

2. A magnetic head unit as claimed in claim 1, characterized in that the cavity is formed at the area of a polymer layer of the magnetic head structure.

3. A magnetic head unit as claimed in claim 2, characterized in that the alignment mark is formed by a recession which is present in the wear-resistant layer.

4. A magnetic head unit as claimed in claim 2, characterized in that the wear-resistant layer has at least one further alignment mark.

5. The magnetic head unit as claimed in claim 2 wherein the magnetic head structure is a thin-film structure.

6. A magnetic head unit as claimed in claim 1, characterized in that the alignment mark is formed by a recession which is present in the wear-resistant layer.

7. A magnetic head unit as claimed in claim 6, characterized in that the alignment mark is formed by a recession which is present in the wear-resistant layer.

8. A magnetic head unit as claimed in claim 6, characterized in that the wear-resistant layer has at least one further alignment mark.

9. The magnetic head unit as claimed in claim 6 wherein the magnetic head structure is a thin-film structure.

10. A magnetic head unit as claimed in claim 1, characterized in that the structure of the contact face area has a relief with a space between two consecutive elevations, or depressions of the relief of at least ¼λ, in which λ is the wavelength of light.

11. A magnetic head unit as claimed in claim 10, characterized in that the wear-resistant layer has at least one further alignment mark.

12. The magnetic head unit as claimed in claim 10 wherein the magnetic head structure is a thin-film structure.

13. A magnetic head unit as claimed in claim 1, characterized in that the wear-resistant layer has at least one further alignment mark.

14. A magnetic head unit as claimed in claim 13, characterized in that a group of transducing gaps is present between two alignment marks.

15. A magnetic head unit as claimed in claim 1, characterized in that the wear-resistant layer has at least one further alignment mark.

16. The magnetic head unit of claim 1 wherein the wear-resistant layers or a layer of chromium nitride.

17. The magnetic head unit of claim 16 wherein the layer of chromium nitride has a thickness of between 20 and 100 mn.

18. The magnetic head unit as claimed in claim 1 wherein the magnetic head structure is a thin-film structure.

19. The magnetic head unit as claimed in claim 1 wherein the magnetic head structure is a thin-film structure.

20. The magnetic unit as claimed in claim 1 wherein the wear-resistant layer is of uniform thickness.

* * * * *